T. J. CONDON.
SADDLE SPRING SUPPORT.
APPLICATION FILED APR. 16, 1919.
1,344,382.
Patented June 22, 1920.
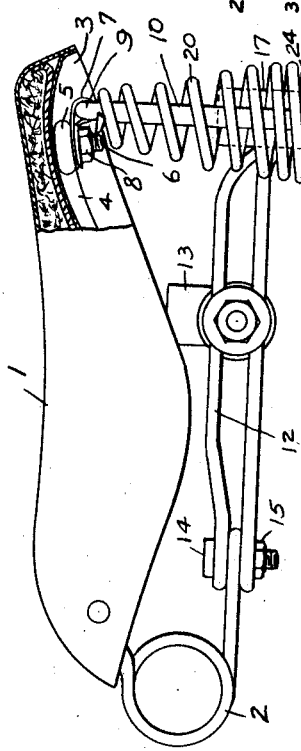
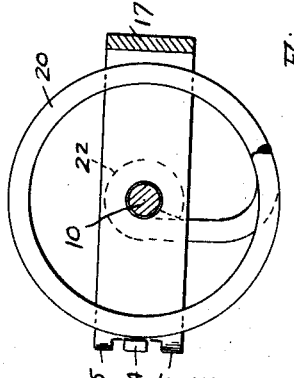
INVENTOR
Thomas J. Condon.
BY
ATTORNEY

UNITED STATES PATENT OFFICE.

THOMAS J. CONDON, OF DETROIT, MICHIGAN.

SADDLE-SPRING SUPPORT.

1,344,382.   Specification of Letters Patent.   Patented June 22, 1920.

Application filed April 16, 1919. Serial No. 290,522.

*To all whom it may concern:*

Be it known that I, THOMAS J. CONDON, a citizen of the United States, residing at Detroit, in the county of Wayne and State of Michigan, have invented a new and useful Saddle-Spring Support, of which the following is a specification.

This invention relates to saddle spring supports such as are commonly employed on bicycles and motor-cycles.

It is usual in the manufacture of such supports to employ two pair of compression and expansion springs to take the load upon the rear end of the saddle, said springs being axially alined but separately formed.

The present invention has for its object the provision of a composite supporting spring beneath the rear end of a saddle, said spring comprising portions respectively adapted to undergo expansion and compression under load.

It is furthermore an object to provide for adjusting the rear end of the saddle at various elevations above the frame of the support by rotatively manipulating the supporting springs beneath said end, said springs having their convolutions so engaged with the frame of the support that they may be shifted up or down similarly to a screw upon being rotated.

In attaining these objects, the invention contemplates pivoting an arch member to the rear end of the saddle in transverse relation thereto, and mounting upon each of the depending portions or legs of said bar a coiled spring having its convolutions engaged at an intermediate point by a projection from the frame of the support, the portions of each spring above and below said projection being respectively subjected to compression and tension when under load and being designed accordingly, the springs being freely rotatable when freed at their lower ends to permit more or less of their convolutions to be shifted above said projections from the frame.

A preferred embodiment of the invention is disclosed in the accompanying drawings, wherein, Figure 1 is a side elevation of a saddle equipped with the improved support, a portion of the saddle base being broken away to show the connection of the support thereto.

Fig. 2 is a rear view of the same, one side of the spring supporting means being shown in section.

Fig. 3 is an enlarged sectional detail of the engagement between the frame of the support and one of the coiled springs, the section being taken on line 3—3 of Fig. 2.

Referring to the parts by the characters of reference on the drawings, 1 indicates a common form of saddle having the base or seat formed of leather in the desired shape, which is mounted at the pommel or forward end upon a coiled loop spring 2 and which is carried at the rear end upon an arcuate metal cantle 3. The cantle is connected to the pommel of the saddle by means of a downwardly arched rearwardly forked brace 4 which is suitably secured at its forward end (not shown) to the looped spring 2, and is provided at each of its rear ends with an eye 5 which engages the under face of said cantle and receives a bolt 6. Each of said bolts also extends through the folded portions of a clip 7 forming a hinge barrel and receives a binding nut 8 by which the parts are drawn together.

Extending transversely of the rear of the saddle is a yoke 9, the cross portion of which is hingedly embraced by the barrels of the clips 7 and the side portions extend downwardly in two spaced parallel stems 10 which are provided at their free ends with binding nuts 11.

The saddle is mounted upon a main support 12 in the form of a divided truss having the usual binding clamp 13 embracing the parallel side portions thereof and which is adapted for attachment to a saddle post as is common. The forward end of the support 12 is connected by a bolt 14 with nut 15 to the looped spring 2, and the rear ends of this support are deflected laterally and terminate in vertically disposed eyes 16. These eyes are connected to the vertical portions upon opposite sides of a laterally offset transversely extending horizontal support 17 by bolts 18 secured by binding nuts 19, and upon the free ends of this support, which is extended to embrace the vertical stems of the yoke 9, the springs for supporting the rear of the saddle are mounted. These springs each comprise a conical upper compression member 20 and a lower cylindrical tension member 21, the convolutions of the former being normally considerably spaced and those of the latter being normally separated only slightly. Said springs respectively concentrically embrace the stems 10 of the yoke, their upper ends being free on said stems and their lower ends formed with eyes 22, engaged between the jam nuts 11 on the corresponding ends of the stems. The end portions of the support 17 project into the coils of the respective springs at intermediate points of the latter, said end portions being apertured to permit the stems 10 to pass freely therethrough and being each terminally formed with a bent-up tongue 24 and a pair of down-turned tongues 25, said tongues laterally engaging the adjacent convolutions of the springs and eliminating any possibility of the intermediate portions of the springs shifting laterally beyond the free ends of the support.

By forming the compression members 20 and expansion members 21 integral, both the manufacture of said members and their assembly with the other elements of the support is simplified. The necessity of a provision for maintaining proper axial alinement of the compression and tension members is eliminated by forming said members as portions of a composite spring.

A further advantage derived from employment of the composite springs lies in the facility with which said springs permit the rear end of the saddle to be adjusted up or down to increase or diminish the tilt or inclination of the saddle. Thus by loosening the lowermost of the clamping nuts 11, the springs are made free to undergo rotative adjustment upon the stems. Engagement of the springs with the support 17 causes them to be adjusted up or down upon being rotated, so as to shift more or less of the convolutions above said support and correspondingly increase or diminish the elevation of the rear end of the saddle above said support. The adjustability of the saddle with respect to its tilt or inclination is desirable to properly accommodate the saddle to the weight of the person using the same, a comparatively slight tilt being sufficient for a rider of light weight and a considerable tilt for a heavy rider.

Both the compression and expansion members of the springs normally operate through the medium of the yoke to sustain the saddle, in the action of which the swinging and vertical movement imparted by the springs will be accommodated by the hinged connection of the cross portion of the yoke with the cantle and by the free passage of the stems through the support 17. The lower members 21 by reason of their slightly open coiled formation will act to retard and cushion the reaction of the springs upon their return to the normal position, thus overcoming the shocks resulting from the rebound, and providing an easy acting spring support for the rider.

It is obvious that changes may be made in the structural details without departing from the essential features herein disclosed, and the invention is presented to include all such modifications and changes as properly come within the meaning of the following claim.

What I claim is:

A saddle support comprising in combination with the saddle base, a frame, a stem engaging the saddle base at its upper end and extending downwardly below said frame, and a composite spring comprising a compression member engaged between the saddle base and frame and a tension member below the frame and normally secured to the lower portion of the stem, said spring being rotatively adjustable through its engagement with the frame to shift more or less of the convolutions above the frame.

In testimony whereof I sign this specification.

THOMAS J. CONDON.